United States Patent Office 3,642,916
Patented Feb. 15, 1972

3,642,916
PREPARATION OF 1,2,4,5-TETRAFLUORO-BENZENE
Julian Frodo Tilney-Bassett, Avonmouth, England, assignor to Imperial Smelting Corporation (N.S.C.) Limited (formerly The National Smelting Company Limited), London, England
No Drawing. Continuation of application Ser. No. 392,939, Aug. 28, 1964. This application Mar. 6, 1968, Ser. No. 711,133
Claims priority, application Great Britain, Sept. 13, 1963, 36,229/63
Int. Cl. C09k 3/02
U.S. Cl. 260—650        3 Claims

ABSTRACT OF THE DISCLOSURE

A method for producing 1,2,4,5-tetrafluorobenzene involving the step of reacting a fluorinated phenyl hydrazine of the general formula:

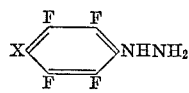

(where X is fluorine or chlorine or bromine) with a source of alkoxide ions.

---

This application is a continuation of application Ser. No. 392,939, filed Aug. 28, 1964 and now abandoned.

This invention relates to the known compound, 1,2,4,5-tetrafluorobenzene.

This invention produces this valuable fluorocarbon in good yield by a simple and efficient method. 1,2,4,5-tetrafluorobenzene is a liquid of relatively high boiling point and is stable to heat and irradiation. Thus, it is valuable as a heat exchange fluid and coolant in specialised locations, e.g. those affected by nuclear radiation. It also has utility as a stable solvent. It can also be used as a starting material for producing fluorine-containing compounds which are useful as heat transfer fluids, dielectrics, polymers, lubricants, pharmaceuticals and bactericides.

One or more of the fluorine atoms in the molecule may be replaced by functional groups such as amino, hydroxyl, sulphydryl, alkoxy, etc. by nucleophilic attack using methods known to the art. Further, 1,2,4,5-tetrafluorobenzene can also be attacked by electrophilic reagents which effect substitution of one or both hydrogen atoms in the molecule, e.g. by nitro or sulphonic acid groups or by halogen atoms.

An example of this is the reaction of 1,2,4,5-tetrafluorobenzene with bromine in oleum. This gives the dibromo compound which can be further reacted with cuprous cyanide to give the dicyano compound, useful as a germicide in soap. Either or both the hydrogen atoms can be replaced by lithium, thus providing useful organometallic intermediates. Thus a wide variety of fluorine-containing compounds can be produced from the product of the process.

As an example of the use of 1,2,4,5-tetrafluorobenzene for making new polymeric compositions, it can be readily converted into a dibromo- or a di-iodotetra-fluorobenzene by the method described by M. Hellman, A. J. Bilbo and W. J. Pummer, J. Amer. Chem. Soc. (1955) 77, 3650. The dibromo or di-iodotetrafluorobenzene is converted into a perfluoropolyphenyl polymer by reaction with activated copper bronze at 200° C.–250° C.

An especially valuable use for these di-halogenotetrafluorobenzenes prepared from 1,2,4,5-tetrafluorobenzene is in the synthesis of tetrafluoroterephthalonitrile and tetrafluoroterephthalic acid, as described in our co-pending application S.N. 269,865, filed Apr. 2, 1963, now U.S. 3,284,484. Tetrafluoroterephthalic acid, so prepared, is a valuable monomer for the preparation of novel condensation polymers, e.g. by condensation with diamines or dihydroxy compounds.

Preparation of 1,2,4,5-tetrafluorobenzene has hitherto been reported on four occasions in the literature. Thus, Finger et al. prepared it by decomposition of a fluoborate formed from 2,4,5-trifluoroaniline (G. C. Finger, F. H. Reed, D. M. Burgess, D. M. Fort and R. R. Blough, J. Amer. Chem. Soc. 1951, 73, 145). Tatlow and co-workers have made it by oxidation of pentafluorophenylhydrazine (G M. Brooke, J. Burdon, M. Stacey and J. C. Tatlow, J. Chem. Soc., 1960, 1768) and by desulphurisation of 2,3,5,6-tetrafluorothiophenol (P. Robson, M. Stacey, R. Stephens and J. C. Tatlow, J. Chem. Soc., 1960, 4754). Recently, Haszeldine and co-workers found that pentafluorophenylhydrazine gives 1,2,4,5-tetrafluorobenzene in 66% yield when heated with stannous chloride and concentrated hydrochloric acid for 4–5 hours (J. M. Birchall, R. N. Haszeldine and A. R. Parkinson, J. Chem. Soc. 1962, 4966).

None of these methods gives 1,2,4,5-tetrafluorobenzene in better than about 66% yield. Since it is an important intermediate in polyfluoroaromatic chemistry, e.g. for the synthesis of mono- and di-substituted tetrafluorobenzenes by electrophilic substitution reactions on one or both of the hydrogen atoms, a high yield simple synthesis for this compound is very desirable.

The present invention consists in a method for the preparation of 1,2,4,5-tetrafluorobenzene in which a fluorinated phenylhydrazine of general formua

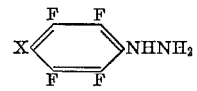

wherein X is fluorine, chlorine or bromine, is reacted with a source of hydroxyl ions or alkoxide ions.

The source of hydroxyl ion may be an aqueous solution or suspension of an alkali metal, or alkaline earth metal, hydroxide. In one such preferred form of the invention the fluorinated phenyl hydrazine of formula p-XC$_6$F$_4$NH.NH$_2$ is prepared from the halocarbon XC$_6$F$_5$ and hydrazine hydrate in an inert solvent, and is reacted with alkali metal, or alkaline earth metal, hydroxide without previous isolation or purification.

A solution of alkali metal alkoxide in the corresponding alcohol is a typical source of alkoxide ion.

In another form of the method of the invention, the source of hydroxyl ion is solid alkali metal hydroxide, and the reaction is carried out by heating the fluorinated phenylhydrazine with the solid alkali metal hydroxide until an exothermic reaction commences, and then discontinuing the heating. It is supposed that solid NaOH (for example) always contains traces of water, thus permitting an ionic reaction. The invention further consists in 1,2,4,5-tetrafluorobenzene prepared by the method as described in the preceding four paragraphs.

By the method of the invention, nitrogen is readily and smoothly evolved and the desired 1,2,4,5-tetrafluorobenzene formed. It may be isolated by any convenient procedure (e.g. steam distillation) and is substantially pure (about 98%). The overall yield may be about 80%.

Since pentafluorophenylhydrazine may be readily prepared in high yield by a reaction between hexafluorobenzene and hydrazine hydrate in refluxing dioxan (this is described in the Haszeldine paper referred to above), a method is now available by which 1,2,4,5-tetrafluorobenzene may be synthesized from hexafluorobenzene by a two-step procedure in about 77% overall yield.

In another aspect, the invention still further consists in the two novel compounds, p-bromo-tetrafluorophenylhydrazine and p-chlorotetrafluorophenylhydrazine. The invention will be more fully described with reference to the following non-limiting examples.

EXAMPLE 1

Pentafluorophenylhydrazine (303 g.) was stirred with a solution of sodium hydroxide (123 g.) in water (750 cc.). The mixture was heated and brought to reflux, then maintained under reflux for 2 hours. The organic product was isolated by steam distillation, washed with water, dried over "Hydrite" and distilled. There was obtained 1,2,4,5-tetrafluorobenzene (186 g., 81% yield), B.P. 90°. Gas chromatography showed that the product contained 1,2,4,5-tetrafluorobenzene (98%), 1,2,3,4-tetrafluorobenzene (1%) and pentafluorobenzene (1%) and the infra-red spectrum was identical to that of a sample of 1,2,4,5-tetrafluorobenzene prepared by desulphurisation of 2,3,5,6-tetrafluorothiophenol.

EXAMPLE 2

Hexafluorobenzene (37.2 g.), hydrazine hydrate (24 cc.) and dioxan (100 cc.) were heated at reflux for four hours. After removing the solvent, the mixture was cooled and treated with sodium hydroxide (24 g. in 100 g. water). The mixture was refluxed for 2 hours and the organic products were isolated by steam distillation. The product (24 g.) was shown by vapour phase chromatography to contain 1,2,4,5-tetrafluorobenzene (22.1 g., 74% yield) and 1,2,3,4-tetrafluorobenzene (0.75 g., 2.5% yield).

EXAMPLE 3

Pentafluorochlorobenzene (98.2 g.) and hydrazine hydrate (60 cc.) and dioxan (400 cc.) were heated at reflux for 1 hour. The solvent was removed and the residue was poured into water (300 cc.), yielding 4-chloro-2,3,5,6-tetrafluorophenylhydrazine (81.5 g.). Recrystallisation from ethanol gave the pure compound, M.P. 76–77° C.

Found (percent): C, 33.6; H, 1.14; F, 35.4; Cl, 16.55. $C_6H_3ClF_4N_2$ requires (percent): C, 34.0; H, 1.7; F, 34.9; Cl, 16.2.

EXAMPLE 4

In the same way as described in Example 3, 4-bromo-2,3,5,6-tetrafluorophenylhydrazine, M.P. 79–80° was produced in 73.5% yield.

Found (percent): C, 27.8; H, 1.2; Br, 30.9; F, 29.4. $C_6H_3BrF_4N_2$ requires (percent): C, 27.9; H, 1.1; Br, 30.5; F, 29.2.

EXAMPLE 5

4-chloro-2,3,5,6-pentafluorophenylhydrazine (15.0 g.) was heated to reflux for 2 hours with a solution of sodium hydroxide (11.2 g.) in water (70 cc.). The organic product (8.7 g.) was isolated by steam distillation and contained, as shown by vapour pressure chromatographic analysis, 95.2% 1,2,4,5-tetrafluorobenzene.

EXAMPLE 6

4-bromo-2,3,5,6-tetrafluorophenylhydrazine (16.4 g.) was reacted with a solution of sodium hydroxide (12 g.) in water (75 cc.) in the same way as Example 5, and gave 1,2,4,5-tetrafluorobenzene in 80.6% yield.

EXAMPLE 7

4-chloro-2,3,5,6-tetrafluorophenylhydrazine (15.0 g.) was heated at reflux for 6 hours with a stirred suspension of calcium hydroxide (12.0 g.) in water (100 cc.). Steam distillation of the product gave 1,2,4,5-tetrafluorobenzene (7.8 g.) of 96.0% purity (yield 71.4%).

EXAMPLE 8

Pentafluorophenylhydrazine (13.9 g.) was added to sodium ethoxide (from 3.25 g. Na) in ethanol (75 cc.) and warmed to 30°. Reaction occurred and the temperature rose to 60°. Addition of water (350 cc.) and steam distillation gave 1,2,4,5-tetrafluorobenzene (8.0 g., 90.9% purity, 69.2% yield).

EXAMPLE 9

Chlorotetrafluorophenylhydrazine (15.0 g.) reacted with sodium ethoxide in ethanol at 10° C. giving 1,2,4,5-tetrafluorobenzene in 67% yield. The reaction conditions were as described in Example 8.

EXAMPLE 10

Bromotetrafluorophenylhydrazine (5 g.) was powdered with sodium hydroxide (2.5 g.) and heated gently until reaction started. After completion of the reaction, the mixture was heated until no more product distilled. The distillate was re-distilled from NaOH (0.5 g.). (Yield: 1.9 g. of 92.8% purity 1,2,4,5-tetrafluorobenzene 61%.)

What is claimed is:

1. A process for preparing 1,2,4,5-tetrafluorobenzene which comprises the step of reacting a solution of alkali metal alkoxide in the corresponding alcohol with a fluorinated phenyl hydrazine of the formula:

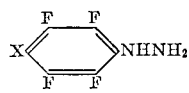

where X is chosen from the group consisting of fluorine, chlorine and bromine.

2. The process of claim 1 wherein the alkali metal alkoxide is sodium ethoxide.

3. The process of claim 1 wherein said solution of alkali metal alkoxide is a solution of sodium ethoxide in ethanol.

References Cited

UNITED STATES PATENTS 3,232,947   2/1966   Haszeldine et al. __ 260—650 F

OTHER REFERENCES

Finger et al., Jour. Am. Chem. Soc., vol. 73, pp. 145–155 QD 1 A 5 (Copy in Library).

Birchall et al., Jour. Chem. Soc., 1962, pp. 4966–4976 QD1C6 (Copy in Library).

Brooke et al., Jour. Chem. Soc., 1960, pp. 1768–1771 QD1C6 (Copy in Library).

Kleinberg et al., Inorg. Chem. D. C. Heath & Co. Boston, 1960, p 603.

Mellor, Comprehensive Treatise On Inorganic and Theoretical Chem. Longmans, Green Co., London 1923 QD 31M4 p. 372.

DANIEL D. HORWITZ, Primary Examiner

U.S. Cl. X.R.

252—67, 69